United States Patent Office 3,547,764
Patented Dec. 15, 1970

3,547,764
RUBBER ARTICLES REINFORCED WITH FIBROUS POLYLACTONES
Gerrit J. van Amerongen, Amsterdam, Netherlands, assignor to Shell Oil Company, New York, N.Y., a corporation of Delaware
No Drawing. Filed July 26, 1967, Ser. No. 656,027
Claims priority, application Netherlands, Aug. 17, 1966, 6611538, 6611539
Int. Cl. B32b 25/10, 27/02
U.S. Cl. 161—184                                    4 Claims

ABSTRACT OF THE DISCLOSURE

Rubber articles having improved physical properties comprise a rubber reinforced with a fibrous polylactone, preferably pretreated with an adhesion-improving agent.

BACKGROUND OF THE INVENTION

In the manufacture of certain articles from vulcanized rubber or plasticized synthetics, such as hoses, conveyors, tires and belts for power transmission and, in particular, car tires, it has been found desirable to incorporate one or more plies of fibrous material, such as threads, cords and fabrics in the rubber or synthetic to obtain added strength. For this purpose fibrous material from rayon, nylon or polyethylene terephthalate is mostly used nowadays. For a fibrous material to be eligible for reinforcing purposes, it must meet a large number of often conflicting requirements, such as high tensile strength, retention of strength under load, high melting point, slight heat evolution on continuous deformation, satisfactory moisture resistance, etc.

Since not all fibrous materials have the desired combination of properties, only a few of them are suitable as reinforcing material.

Owing to the superior properties of newer materials such as nylon, which in many respects has excellent features, formerly used materials such as cotton fell out of use. Tires with nylon reinforcement do not have all the desired properties, particularly as regards dimensional stability on prolonged unilateral load, such as when left unused for some months. The plane of contact with the ground of such a tire acquires a certain flatspotting, through which the car acquires a restless, noisy ride. For this reason new cars are preferably not supplied with tires having nylon reinforcement.

SUMMARY OF THE INVENTION

It has now been found that polylactones are particularly suitable as reinforcing material. The present invention therefore relates to articles from rubber or plasticized synthetics, in particular rubber car tires, reinforced with one or more plies of fibrous material, characterized in that the fibrous material consists either partly or completely of a polylactone, preferably substantially, i.e., to an extent of more than 90%, of polypivalolactone which is, preferably, pretreated with certain adhesion agents.

Synthetic fibers from polylactones, such as polypivalolactone, are known already. It could not be predicted however, that this fibrous material should have that special combination of properties which renders it so suitable as reinforcing materials in objects from vulcanized rubber or plasticized synthetic.

Important features of present-day car tires are dimensional stability and evolution of heat in the reinforcing material on stretching, flexing and shock load, which have a great influence on the flatspotting phenomenon, the useful life of the reinforcing material the adhesion between fiber and rubber and hence on the riding properties and the life of the tire in general. To study these properties a thread was examined in the Instron tensile testing apparatus. The thread was stretched at a rate of 10% of its, length per minute at 20° C. and 65% relative humidity to 5 and 15%, respectively, of its length, kept for 30 seconds in stretched condition and then released at the same rate. The resilience of the tensile recovery will not be complete; the thread will recover only to a certain percentage of its original length: the higher this percentage, the better the dimensional stability of the thread will be. During its elongated condition, stress decay occurs: the less this stress drops, the better the thread retains its resilience. During elongation a certain amount of work is done: part of this work is recovered during release. The part that is not recovered remains as heat in the fiber; the higher the percentage of recovered work, the less heat is generated in the fiber during deformation. The results of the tests are listed in the following table.

TABLE I

| Polymer | Thread | | Tensile recovery, percent | | Stress decay, percent | | Work recovered, percent | |
| --- | --- | --- | --- | --- | --- | --- | --- | --- |
| | Denier | Number of filaments | | | At an elongation of— | | | |
| | | | 5 | 15 | 5 | 15 | 5 | 15 |
| Polypivalolactone (PPL) | 68 | 15 | 98 | 96.5 | 6 | 6 | 80 | 63 |
| Polyethyleneterephthalate (PET) | 70 | 34 | 63 | 40 | 20 | 14 | 22 | 19 |
| Nylon 6-6 | 41 | 13 | 86 | 77 | 17 | 13 | 47 | 41 |
| Rayon | 149 | 40 | 41 | 28 | 28 | 21 | 13 | 13 |

On the same tensile testing instrument the fatigue resistance of the material was determined by stretching a thread at a rate of 200% per minute between 1 and 5% and releasing it again. We measured the quantities of energy to elongate at the 1st, the 25th and the 250th cycle. The decreases in these quantities of energy for the various polymers are listed in the following table.

TABLE II

| Polymer | Thread | | Decrease of energy, percent, after— | |
|---|---|---|---|---|
| | Denier | Number of filaments | 25th cycle | 250th cycle |
| PPL | 73 | 18 | 9 | 13 |
| Nylon 6-6 | 74 | 23 | 13 | 29 |
| PET | 77 | 24 | 19 | 43 |

These data show that polypivalolactone suffers less from fatigue than for example nylon or polyethylene terephthalate. Also in this case the lower drop in quantity of energy in the polypivalolactone fiber manifests the lower heat evolution in the fiber.

Another important feature is that pivalolactone polymer retains a good resilience also at elevated temperature, as appears from measurements on test specimens from various polymers, mentioned in Table III.

TABLE III

| | E-modulus*, kg./cm.$^2$ ($\times 10^3$) | | | G-modulus, dyn/cm.$^2$ ($\times 10^9$) | |
|---|---|---|---|---|---|
| | PPL | Nylon-6 | PET | PPL | Nylon-6 |
| Temperature: | | | | | |
| 20° C | 24 | 7 | 20 | 10 | 7 |
| 60° C | 14 | 5 | 15 | 9 | 2.6 |
| 100° C | 9 | 3.8 | 5 | 8 | 1.5 |
| 140° C | 7 | 2.8 | 3 | 5.3 | 0.95 |
| 180° C | 5 | <2 | 2.1 | 3.8 | 0.6 |

*At an elongation of 0.2%.

Also the mechanical strength and moisture resistance of the fibers from polypivalolactone are excellent as compared with those of fibers from nylon or polyethylene terephthalate of identical tire, as appears from Table IV.

TABLE IV

| Polymer | PPL | Nylon-6 | PET |
|---|---|---|---|
| Denier number | 5 | 5 | 5 |
| Tenacity (g./den.) | 5.4 | 4.0 | 4.0 |
| Knot strength (g./den.) | 5.4 | 3.9 | 3.9 |
| Water absorption at 20° C. (percent) | 0.2-0.3 | 8-12 | 0.5-4 |

The fiber material applied according to the invention consists either partly or completely of a polylactone, i.e., of a polymer of a cyclic ester of a hydroxycarboxylic acid. The term polymers here comprises both homopolymers and copolymers, for example, of various lactones inter se, or copolymers with, for example, epoxides. These polymers may be formed by opening of the lactone ring with formation of a linear polyester structure. The polymers are preferably obtained from β-lactones, in particular from α,α-dialkyl-β-propiolactones, each of whose alkyl groups contains at most 4 carbon atoms. The most important representative of this group is α,α-dimethyl-β-propiolactone, also called pivalolactone. By means of initiators such as triethylamine, tetraphenylphosphonium bromide, triphenylphosphine, betaines, etc., with or without chain transfer agents such as pivalic acid and phenol, polymers with very high molecular weights can be obtained, which can be spun to fibers in the usual way, for example, according to the melt-spinning process. The polypivalolactone to be spun has preferably an intrinsic viscosity of between 1.5 and 6 dl./g., measured at 25° C. in trifluoroacetic acid. For use as fibrous material according to the invention the fibers can be used as single filaments, yarns, cords or fabrics of varying structure. This fibrous material is preferably subjected to a pretreatment with products based on polyepoxides, polyisocyanates or compounds with at least 2 NH groups, which agents improve the adhesion of the fibrous material to the rubber or snythetic.

The term "rubber" comprises both natural and synthetic rubber. Preferably used synthetic rubbers are the homopolymers and copolymers of conjugated aliphatic dienes, in particular of butadiene, isoprene or chloroprene. As copolymer components, and particularly eligible are styrene, a vinylpyridine and acrylonitrile, and also unsaturated compounds such as methyl methacrylate, 3,4-dichloro-α-methylstyrene and methylisopropenyl ketone. The copolymer preferably contains at least 40% of dienes, for example, a copolymer consisting of 70% butadiene and 30% styrene or a copolymer comprising 70% butadiene, 15% styrene and 15% methylvinylpyridine. Other suitable synthetic rubbers are isobutene copolymers (butyl rubber), polychloroprene and ethene/propene copolymers.

A special class of rubbers, comprising certain block copolymers of conjugated dienes with monovinyl arenes may be employed. When these have the typical structure polystyrene-polybutadiene-polystyrene they have high stress-strain properties and do not require vulcanization.

The rubber uslally contains various additives such as those necessary to effect vulcanization. Examples of these are sulfur, sulfur chloride, sulfur thiocyanates, thiuram polysulfides, other organic and inorganic polysulfides, peroxide, etc. The sulfur-containing additives are preferably used in quantities varying from about 0.1 part to 10 parts per 100 parts (by weight) of rubber, preferably from 0.3–3 parts per 100 parts of rubber.

Vulcanization accelerators and acceleration activators may also be present, in particular when sulfur-containing compounds are used as vulcanizers. Examples of accelerators are tetramethylthiuram disulfide, zinc dibutyl dithiocarbamate, dipentamethylenethiuram tetrasulfide, mercaptobenzothiazole, hexamethylenetetramine, diphenylguanidine, diphenylthiourea, benzothiazyl disulfide, piperidiniumpentamethylene dithiocarbamate and lead dimethyldithiocarbamate. These compounds are preferably used in quantities varying from about 0.01 to about 5% by weight of the rubber.

Many other substances can be incorporated in the rubber or the synthetic compositions, such as carbon black, pigments, lubricants, aromatic extracts, antioxidants, anti-scorching agents, etc.

After the fibrous material has preferably been pretreated as indicated above, the rubber is deposited on it, after which the reinforced object is heated for a short time at a temperature above 100° C. to vulcanize the rubber. Suitable vlucanization conditions are temperatures of 125–175° C. for 15–60 minutes.

Although the reinforced objects according to the invention are preferably made from vulcanized rubber, some objects such as conveyors and rain wear can also very well be made from plasticized synthetic, in particular from polyvinyl chloride. Suitable plasticizers are, for example, diisooctyl phthalate, dinonyl isophthalate, diisodecyl adipate, dicyclohexyl sebacate, epoxidized oils, polypropylene adipate, etc. The plasticizers are mostly used in quantities of 40–100%, calculated on the weight of the synthetic material. Also in this application the fibrous material is usually pretreated as indicated above. According to a suitable method the fibrous material is first impreganted with a solution of a homopolymer or copolymer of vinyl or vinylidene chloride, a plasticizer as indicated above and an adhesion-improving agent such as an amine, for example, 2,4-dimethylaniline; amides, for example, polyamines with polycarboxylic acids, or the amide of diethylenetriamine and citric acid, cyanuric acid derivatives such as triallyl cyanurate; and the like. After the fibrous material has ben dried under tension, preferably at temperatures of from 120 to 220° C., the plasticized synthetic material is applied to it, which is followed again by a thermal treatment, preferably between 120 and 220° C., in particular 160 and 220° C.

The present invention relates, inter alia, to a process to improve the adhesion of a polypivalolactone fibrous material, such as threads, yarns, cords and fabrics, to rubber, the characteristic feature being that the fibrous material is treated with an adhesion-improving agent on the basis of a polyisocyanate or a derivative thereof, a polyepoxide and/or a compound with at least two NH groups.

The first group of adhesion-improving agents includes the organic polyisocyanates or derivatives thereof. Also the analogous thio compounds, i.e., the polyisothiocyanates, are suitable, although they are not preferable to polyisocyanates. Examples of suitable polyisocyanates are methylene-bis-(4-phenyl isocyanate), naphthalene di- and triisocyanates, 2,4-tolylene diisocyanate, p,p',p"-triphenylmethane triisocyanate, hexamethylene diisocyanate, 2,4-chlorophenylene disocyanate, etc.

Treatment with adhesion-improving agents based on polyisocyanates preferably includes also impregnation of the fibrous material with a solution or dispersion, preferably an aqueous latex, of rubber. For this purpose one can proceed in various ways:

(a) According to the preferred method the fibrous material is first treated with the polyisocyanate or derivative thereof, after which it is dried at elevated temperature, for example, 75–150° C. This is followed by the impregnation with the rubber solution or dispersion, after which the material is dried again at elevated temperature. The second drying step is usually performed at slightly higher temperatures, such as from 120 to 220° C.; however, also lower temperatures may be used, the drying times then being longer of course. Too high temperatures are not advisable, because they may adversely affect the dynamic properties of the fibrous material.

(b) The fibrous material is impregnated simultaneously, i.e., with a mixture of polyisocyanate, in particular a derivative thereof and rubber and then dried at temperatures of between 120 and 220° C. as indicated above.

(c) The fibrous material is treated with a preparation made by heating a polyisocyanate and a rubber, preferably in an organic solvent, until a strong decrease in viscosity has occurred and a brushable liquid has been formed; this is followed by drying at 120–220° C.

(d) The fibrous material is first treated with the rubber solution or dispersion and then after drying at 120–220° C. with the polyisocyanate, after which it is dried again in the same temperature range.

The polyisocyanate can be used in an inert, dry solvent. Suitable solvents are chlorinated hydrocarbons such as methylene and ethylene chloride; toluene and benzene; ethers, esters and ketones, such as methyl ethyl ketone. The solution usually contains 1–10%, preferably 3–6% by weight of polyisocyanate. The result of the impregnation treatment is that in general 0.5–15%, in particular 1–5% w. of polyisocyanate or derivative thereof is deposited on the fiber material after drying.

For the impregnation of the fibrous material to improve the adhesion to rubber one preferably employs a styrene-butadiene copolymer, a polychloroprene or a diene/vinylpyridine copolymer.

To improve the adhesion to butyl rubber, butyl rubber is also used to advantage in the impregnation. If the adhesion to ethene-propene or ethene-butene rubber is to be improved, it is advisable, after impregnation with the adhesive such as polyisocyanate or its derivatives and after drying, to impregnate with a solution of chlorosulfonated products of these rubbers or with a solution of an ethene-propene or ethene-butene rubber at 150–200° C. treated with an unsaturated carboxylic acid or derivative such as maleic acid or maleimide and a peroxide such as di-tert-butyl peroxide.

When impregnating the fibrous material the rubber may be used in the form of a solution, for example, in petroleum ether, carbon tetrachloride, benzene, methyl isobutyl ketone, etc. For various reasons, however, it is advantageous to use the rubber in the form of an aqueous latex. In this case one will obviously not use the free polyisocyanate together with the rubber latex. The concentration of the rubber in the solution or the latex is usually 1–50% w., for example, 10–30% w.

The aqueous rubber latex in general has a pH value of above 7, and preferably between 8 and 10. To adjust to the desired acidity one may use alkalis such as ammonia. If desired, however, one may also adjust the pH of the latex to acidity, i.e., below 7 and to about 3, for example, when latices of elastomers are used, which are stable in an acid medium only.

It may be advantageous previously to impart a greater plasticity to the rubber used for the impregnation, for example, by kneading or by adding peptizers, such as aromatic mercaptans and sulfides, for example, bis-(o-benzamideophenyl)disulfide and thio-$\beta$-naphthol. As a rule 1–5% w. of the peptizer, calculated on rubber, is sufficient.

The rubber solution or dispersion may also contain other additives such as dispersants, for example, sodium dioctyl sulfosuccinate; colloid-protecting agents such as sodium carboxymethyl cellulose, polyethylene glycol and polyvinyl pyrrolidone; dyes or pigments; smaller quantities of catalytically active materials such as zinc adipate, titanium oxychloride, $BiCl_3$, dibutyl tin oxide, trialkyl phosphines or trialkylamines, which are suitable for accelerating the conversion of the polyisocyanates with fabric and the rubber constituents.

The rubber solution or dispersion contains preferably also an aldehyde precondensate and if necessary, although less desired, also the constituents of the precondensate. The aldehyde in mind is in the first place formaldehyde and paraformaldehyde. As condensation partner for the aldehyde, resorcinol is preferably used, although for this purpose also phenol, cresol, melamine and urea are eligible. The precondensate is mostly used as a water-soluble resol. The quantity of precondensate in the rubber solution or dispersion is usually 1–25, preferably 2–10% w.

In connection with the physiologically harmful properties of free isocyanates one preferably uses derivatives in which the isocyanate occurs in a bound state. This will also be done if the fibrous material is to be treated simultaneously with polyisocyanate and aqueous rubber dispersion. There are various methods to bring the polyisocyanate in a bound state, i.e., mechanically or chemically.

The polyisocyanate can be bound mechanically by coating it, in a finely divided condition, with a film-forming compound resistant towards the solvent or water to about 50° C. This can be done by spray-drying a solution of the film-forming compound in which the polyisocyanate is dispersed or dissolved. Suitable film-forming compounds are, for example, polystyrene, chlorinated polyethene, polycondensates from substituted phenol, xylene and formaldehyde, neoprene and chlorinated polyphenyl. Naturally, not all film-forming compounds deposited on polyisocyanates for application in aqueous dispersions also give satisfactory results on polyisocyanates used in solution.

This depends, for example, on the nature of the solvent used in the rubber solution and on the influence thereof on the film-forming compound. A correct choice of the film-forming compound may also further improve the adhesion of the fibrous material to special types of rubber. To the film-forming compound or to the coated polyisocyanate various additives may be added such as plasticizers, wetting agents, dyes, antioxidants and isocyanate catalysts as mentioned hereinbefore.

In a chemically bound polyisocyanate the isocyanate group is reacted with a compound containing active hydrogen atoms, in particular with compounds possessing one or more phenolic or alcoholic hydroxyl groups or amino hydrogen atoms. Examples of these compounds are phenol, cresol, xylenol, resorcinol, ethylene glycol, diethylene glycol, glycerol, water-soluble phenol/formaldehyde condensates, for example, a condensate obtained from resorcinol and formaldehyde in a molar ratio of 4/1 to 1/1; ethylenediamine, m-phenylenediamine, etc. In polyisocyanates which were "blocked" or "masked" with aromatic compounds such as phenols, their reaction with formaldehyde or paraformaldehyde may result in even further improvements in adhesion.

The preferred, "masked" polyisocyanates include the reaction products of an ester of cyanuric acid, preferably of an unsaturated aliphatic ester of cyanuric acid, in particular of triallyl cyanurate and a more than equivalent quantity of a polyhydric phenol, such as pyrocatechol, hydroquinone, pyrogallol and, in particular, resorcinol. It is known that cyanurates, i.e., compounds with a triazine ring, can be regarded as trimerization products of isocyanates. In this respect cyanurates can therefore be regarded as "masked" polyisocyanates. More in particular, this embodiment of the process according to the invention comprises the deposition on the fibrous material (a) of an aqueous solution of the further reaction product of an aldehyde, preferably formaldehyde and the reaction product of the unsaturated aliphatic ester of cyanuric acid and the more than equivalent quantity of the polyhydric phenol and (b) of a rubber latex followed by drying of the fibrous material thus coated, at a temperature of between 120 and 220° C. Components (a) and (b) can be separately applied to the fibrous material. The advantage of the present embodiment, however, is that components (a) and (b) can be applied to the fibrous material simultaneously, i.e., as a mixture. Component (b) preferably contains, in addition to the rubber latex, a dispersed precondensate of an aldehyde, in particular a resorcinol-formaldehyde precondensate, or the constituents for such a precondensate.

A suitable mode of preparing component (a) comprises reaction of a lower, unsaturated, aliphatic triester of cyanuric acid with at least six-fold molar excess of the polyhydric phenol, which reaction, if desired, can be accelerated by catalysts such as sodium methylate, p-toluenesulfonic acid and tetraethyl titanate. In the further reaction thereof with aldehyde one preferably uses molar ratios of aldehyde to phenol of between 1:5 and 3:5. This further aldehyde reaction product can be suitably dissolved in a concentration of 5–60% w. in dilute aqueous ammonia.

The rubber latex contains preferably a vinylpyridine copolymer, for example, one consisting of 70% butadiene, 15% vinylpyridine and 15% styrene, with a rubber content of 3–40% w. One can also use mixtures of various kinds of rubber latices, such as a mixture of a vinylpyridine copolymer latex and a GR-S (butadiene/styrene) latex.

The ratio by weight of rubber to aldehyde precondensate is mostly between 10/1 and 3/2. After impregnation the fibrous material contains preferably 3–25% w. of solids, calculated on said material, taken up from component (b).

The ratio by weight of the components (a) and (b) deposited on the fibrous material is between 1:1 and 1:20.

As "masked" polyisocyanate one may also use a polymerized triallyl cyanurate, preferably in combination with a vinyl chloride polymer. According to a suitable embodiment one deposits on the fibrous material a composition consisting of a plasticized polyvinyl chloride, triallyl cyanurate and a polymerization catalyst such as cumene hydroperoxide and di-tert-butyl peroxide. This composition usually contains 50–90% w. of polyvinyl chloride, 30–35% w. of plasticizer, 15–25% w. of trially cyanurate and 0.1–0.8% w. of catalyst. By heating the impregnated fibrous material at 120–220° C. for 0.1–30 minutes the triallyl cyanurate is polymerized. The fibrous material is impregnated with a rubber composition, in particular a rubber latex, and dried again at 120–220° C. Also in this case the rubber latex contains preferably a vinylpyridine copolymer and an aldehyde precondensate, as indicated above. Instead of the precondensate one can also incorporate the constituents thereof, such as resorcinol and formaldehyde, in the rubber latex.

In the second group of adhesion-improving agents polyepoxides are used, i.e., compounds with more than one epoxy group per molecule, which results in excellent adhesion of the fibrous material to rubber. In this procedure the fibrous material is impregnated with the polyepoxide and cured with an epoxy curing agent. Suitable curing agents are, for example, polycarboxylic acids and anhydrides such as tetrahydrophthalic anhydride; Friedel-Crafts catalysts such as $BF_3$ and complexes thereof; zinc fluoborate and zinc fluosilicate; phosphoric acid and partial esters thereof such as n-butyl orthophosphate and hexaethyl tetraphosphate; amino compounds such as diethylenetriamine, dicyanodiamide, benzyldimethylamine, dicyclohexylamine, N-butylimidazole, adducts of polyepoxides with an excess of polyamine; aminoplasts such as urea/formaldehyde and melamine/formaldehyde resins; phenol/aldehyde condensates such as a resorcinol/formaldehyde resin. One may, if desired, also deposit the polyepoxide without a curing agent on the fibrous material at temperatures of between 20 and 200° C., at which temperatures heating times of 1–10 minutes are often sufficient.

Examples of polyepoxides which can be applied according to the invention are polyglycidyl ethers of polyvalent phenols such as diphenylolpropane, in particular those with a viscosity of less than 300 poises at 25° C.; epoxy esters of polycarboxylic acids such as diglycidyl isophthalate; polymers and copolymers of unsaturated epoxy compounds such as allylglycidyl ether. Preferably used polyepoxides are the water-soluble polyglycidyl ethers of polyhydric alcohols with 2–10 carbon atoms and 2–6 hydroxyl groups per molecule, such as glycerol and butanetriol. These preferred polyepoxides mostly have an epoxy content of at least 0.3 eq./100 g., in particular of 0.4–0.7 eq./100 g.

The polyepoxides are preferably used as aqueous solution, emulsion or dispersion. Examples of suitable emulsifiers and dispersants are ethoxylated alkylphenols, carboxymethylcellulose, polyvinyl alcohol, alkyl and alkylaryl sulfonates and mixtures thereof. Emulsifiers and dispersants are usually applied in quantities of 0.1–5% w., the polyepoxide in quantities of 1–20, in particular 2–15% w., calculated on aqueous solution, emulsion or dispersion. The curing agent is commonly used in a quantity equivalent to that of the polyepoxide, for catalytically active curing agents in a quantity of 1–5% w., calculated on polyepoxide. The curing agent is preferably mixed with the aqueous solution, emulsion or dispersion shortly before the treatment of the fibrous material. During impregnation the fibrous material usually takes up 0.5–15% w. of polyepoxide plus curing agent, after which the material is dried for 1–30 minutes at a temperature of 80–200° C. to a water content of less than 5% w.

After the treatment with the polyepoxide usually follows an impregnation of the dried fibrous material with a rubber latex, preferably in combination with a precondensate of an aldehyde and a urea, melamine, ketone or, in particular, a phenol such as resorcinol, as described hereinbefore for the adhesion-improving treatment of the fibrous material with cyanuric acid derivatives. This is followed again by drying at 120–220° C.

According to a special embodiment of the adhesion-improving treatment with polyepoxide one impregnates the fibrous material with a preferably aqueous solution, emulsion or dispersion of a polyepoxide, a hydroxymethylated, masked polyisocyanate, a rubber latex and if desired an epoxy curing agent such as a tertiary amine and/or a carboxylic anhydride, after which the fibrous material is dried at 120–220° C. Suitable hydroxymethylated masked polyisocyanates can, for example, be obtained by further reaction of formaldehyde with a reaction product of a phenol with a polyisocyanate, as described already hereinbefore.

In the third, but less preferred group of adhesion-improving agents use is made, preferably in combination with plasticized polyvinyl or polyvinylidene chloride, of compounds with at least two NH groups, for example, polyamines, such as polyethyleneimine and polyamides, for example, those known as "Versamid." These latter polyamides are obtained by condensing a polymerized unsaturated acid, such as linoleic acid, with polyamines, such as ethylenediamine. Other suitable polyamides are obtained by condensation of polyamines such as diethylenetriamine, with dicarboxylic acids, such as succinic acid, adipic acid, etc. If desired, this polyamide can be further condensed with an aldehyde such as formaldehyde, acrolein or furfural. Also the polyamine can be further condensed with aldehydes, for example, triethylenetetramine with glyoxal. Additionally, aminoamide polymers may be used as adhesion-improving agents.

If necessary simultaneously, but preferably after impregnation with the polyamine or polyamide, the dried fibrous material is impregnated with a rubber latex, especially in combination with a precondensate of an aldehyde with preferably a phenol such as resorcinol, as described hereinbefore for the adhesion-improving treatment with cyanuric acid derivatives. This is again followed by drying at 120–220° C.

The adhesion-improving treatment of the fibrous material can take place in a stretched or a released state. Thus, the yarns or cords can be dipped as skeins in the adhesives. These agents can also be applied, however, by brushing or spraying. A fabric can also be passed continuously on rolls through a bath containing the agent. If necessary, excess adhesive can be removed by centrifuging or passing. During drying it is desirable to keep the fibrous material stretched to prevent thermal shrinkage. It is assumed that heating during drying causes crosslinking.

The invention in addition relates to a process for the preparation of rubber articles, in which they are reinforced in unvulcanized condition with a polypivalolactone fibrous material, the adhesion of which material was improved as described hereinbefore, after which the articles are vulcanized.

EMBODIMENTS OF THE INVENTION

Example I

A 1,000 denier doubled tire cord of polypivalolactone was impregnated with a composition consisting of 100 parts (by weight) of a polyglycidyl ether of glycerol with a mol. weight of 324 and an epoxy content of 0.671 eq./100 g., 100 parts of 10% aqueous solution of an 85% hydrolyzed polyvinyl acetate, and enough water as to obtain a solution with 15% of the polyglycidyl ether, after which 25 parts of ethylenediamine were added with stirring. The impregnated cord was dried for 5 minutes at 143° C. under tension, after it was once more impregnated with a 20% aqueous composition comprising 244 parts of 41% vinylpyridine/butadiene (30/70) rubber latex, 266 parts of a 6.4% resorcinol/formaldehyde resin solution and 61 parts of water. It was then once more dried under tension for 5 minutes at 143° C.

Of this cord a 2-ply car tire carcass was made, to which a rubber of the following composition was applied.

| | Parts by weight |
|---|---|
| Smoked natural rubber | 65 |
| GR–S (a butadiene/styrene copolymer) | 35 |
| ISAF carbon black | 46 |
| Stearic acid | 2 |
| Pine tar | 4 |
| Diamine antioxidant | 1 |
| Zinc oxide | 3.5 |
| Dibenzthiazyl disulfide | 0.6 |
| Tetramethyl thiuram disulfide | 0.2 |
| Sulfur | 2.8 |

The tire was then transferred to a mold and vulcanized for 30 minutes at 145° C.

Example II

A plain woven fabric 80 x 80 of 275 denier filaments of polypivalolactone was passed through a composition consisting of 10 parts of polyvinyl chloride, 6 parts of di-2-ethylhexyl phthalate, 2 parts of a polyamide from a polycarboxylic acid and a polyamine, 1 part of cyclohexanone and 1 part of n-butanol. After wiping off the excess composition, 5% of it remained on the fabric, after which it was dried under tension for 30 seconds at 220° C.

A conveyor belt was made from 3 plies of this pretreated fabric and a plastisol consisting of 100 parts of polyvinyl chloride, 50 parts of di-2-ethylhexyl phthalate, 20 parts of an aromatic petroleum extract, 20 parts of dimethyl ester of 8,12-eicosadiene-1,20-dicarboxylic acid, 10 parts of carbon black, 1 part of lead stearate and 1 part of cadmium naphthenate. The belt with a width of 40 cm. and a thickness of 6 mm. was heated on heated rolls for 10 minutes under tension at 180° C.

Example III

A tire cord, consisting of doubled 1,000 denier spun yarn of polypivalolactone was passed at room temperature through a polyepoxide composition. The composition was prepared from 100 parts by weight of a polyglycidyl ether, obtained from glycerol and epichlorohydrin, with an epoxy content of 0.671 equivalent per 100 g. After mixing it with 100 parts of a 10% aqueous solution of a polyvinyl acetate hydrolyzed to an extent of 85%, it was diluted with water to a concentration of 15% polyglycidyl ether. Subsequently 25 parts of ethylenediamine were added with stirring to the solution.

The treated cord, which had taken up 30% of the composition, was dried for 5 minutes under tension at 143° C. Then the cord was passed at room temperature through a second composition, obtained by mixing 244 parts of a 41% 70 butadiene/30 vinylpyridine rubber latex, 266 parts of a 6.4% resorcinol-formaldehyde resin solution and 61 parts of water. The cord, which had taken up 25% of the second composition, was once more dried under tension for 5 minutes. After embedding the tire cord in butadiene-styrene rubber and vulcanization, the adhesion between cord and rubber was found to be very good. A similarly treated tire cord, which had not been pretreated with the polyepoxide composition, however, showed poor adhesion to rubber.

Example IV

Example III was repeated, but with a polyepoxide containing the following constituents:

74 parts of a polyglycidyl ether of 2,2-bis(4-hydroxyphenyl)propane with a viscosity of 150 poises at 25° C., a mol. weight of 350 and an epoxy content of 0.50 eq./100 g. were mixed at 100° C. with 64 parts of a polyethylene glycol ether of sorbitan monopalmitate, after which 65 parts of a 5% solution of 85% hydrolyzed polyvinyl acetate were added.

To the emulsion obtained were added 25 parts of ethylenediamine, after which it was diluted with water to a concentration of 15% polyglycidyl ether.

After embedding the tire cord in natural rubber and vulcanizing, the adhesion between cord and rubber was found to be very good.

Example V

The polyepoxide used was prepared by passing 10.5 moles of ethylene oxide at 40–50° C. through 3.5 moles of glycerol containing a small quantity of BF$_3$-ether complex as catalyst. The product obtained had a mol. weight of 224 and a hydroxyl content of 1.417 eq./100 g. To 101 parts of this product was added enough BF$_3$-ether complex as to give a pH of 1.0, after which 132 parts of epichlorohydrin were added dropwise at 65–70° C. The reaction was then continued for another 15 minutes, the product was dissolved in benzene, dehydrohalogenated with 57 parts of NaOH at 88° C. in ¾ hour, the salt was filtered off and the benzene was evaporated from the filtrate. The polyglycidyl ether had a mol. weight of 455 and an epoxy content of 0.524 eq./100 g.

From 100 parts of this polyglycidyl ether, 100 parts of a 10% polyvinyl acetate hydrolyzed to an extent of 85%, and a water solution was prepared containing 15% of the polyglycidyl ether. After 25 parts of ethylenediamine had been added to the composition, a tire cord consisting of doubled 1,000 denier spun yarn of polypivalolactone was passed at room temperature through the composition, of which 25% was taken up. The cord was dried in spun condition for 5 minutes at 143° C., after which it was passed at room temperature through a rubber latex. The latex contained 244 parts of a 41% 70 butadiene/30 vinylpyridine copolymer latex and 260 parts of a 6% aqueous solution of a malamine formaldehyde resin, further diluted with water a solids content of 20%. The treated cord was dried at 95° C., embedded in GR–S rubber and vulcanized for 30 minutes at 145° C. The adhesion obtained between cord and rubber proved to be very good.

Example VI

A cord of doubled 1100 denied spun yarn of polypivalolactone was passed at room temperature through a 10% aqueous solution of the polyglycidyl ether used in Example III, after which it was dried under tension of 3 minutes at 177° C. The cord was then passed through latex prepared as follows:

To 75 parts of water were added 10.93 parts of resorcinol, 5.23 parts of formaldehyde (37% solution), 1.35 parts of NaOH (10% solution) and 100 parts of 75 butadiene/25 styrene copolymer latex (40% solids). The composition was allowed to age for 4 hours, after which 3.52 parts of sodium dimethyl dithiocarbamate (41% solution) and water were added till a solids content of 20% had been reached.

When the cord had been passed through this composition, it was dried under tension for 3 minutes at 177° C., embedded in natural rubber and vulcanized for 5 minutes at 150° C. The adhesion obtained between cord and rubber was found to be very good.

Example VII

In the same way as in Example VI two rubber latices were prepared from the following components:

| Latex | A | B |
| --- | --- | --- |
| Resorcinol (pbw.) | 0.5 | 2.0 |
| Formaldehyde (37%) | 0.65 | 2.6 |
| NaOH (10%) | 0.5 | 2.0 |
| 70 butadiene-15 styrene-15 vinylpyridine copolymer latex (40%) | 3.6 | 15.0 |
| 75 butadiene-25 styrene copolymer latex (39%) | 6.8 | 27.0 |
| Polyglycidyl ether according to Example III | 3.5 | |
| Water | 85 | 50 |

A tire cord of double 1100 denier spun yarn of polypivalolactone was passed at room temperature through latex A, after which it was dried under tension for 3 minutes in an air stream at 24 C. The cord was then passed through latex B and dried under tension for 3 minutes at 210° C. It was then embedded in natural rubber and vulcanized for 5 minutes at 150° C. The adhesion obtained between cord and rubber was found to be very good.

Example VIII

A composition was prepared from 10 parts of polyvinyl chloride, 6 parts of diisooctyl phthalate, 2 parts of "Veramid 125" (a polyamide prepared from a polycarboxylic acid and a polyamine), 1 part of cyclohexanone and 1 part of butanol. A tire cord of doubled 1,000 denier spun yarn from polypivalolactone was passed through the composition, after which the excess was wiped off, so that 5% of the composition was left on the cord. The cord was dried under tension for ½ minute at 220° C., then passed according to Example III into a vinyl pyridine rubber/resorcinol-formaldehyde latex, where it took up 2% solids. After ⅓ minute drying the cord was embedded in GR–S and vulcanized. The adhesion obtained between cord and rubber was good.

Example IX

A tire cord of polypivalolactone in the form of a skein was dipped for 15 minutes in a 2% aqueous solution of "Polymin-P" (a polyethyleneimine), after which the excess "Polymin" was centrifuged off. The cord was then passed through a bath containing 500 parts of a 40% latex of a 75 butadiene-15 vinylpyridine-15 styrene copolymer, 20 parts of resorcinol, 12 parts of formaldehyde and 450 parts of water. The cord was dried under tension for ½ minute at 205° C., embedded in GR–S rubber and vulcanized. The adhesion between cord and rubber was found to be good.

Example X

At 180° C. 66 parts of resorcinol were mixed with 16 parts of triallyl cyanurate. After the temperature had been raised to 230° C., 0.165 part of $Pb_3O_4$ was added and the mixture was kept at this temperature for 1 hour. Using a reflux condenser 19 parts of formaldehyde were then added dropwise at 120° C. in 30 minutes. After cooling to 80° C. 300 parts of a 2% ammonia were added to the reaction product.

A tire cord of doubled 1100 denier spun yarn of polypivalolactone was immersed in this composition and dried under tension for 2 minutes at 150° C. The cord was then passed through a latex as used in Example IX and dried under tension for 2 minutes at 150° C. and for 3 minutes at 220° C. After being embedded in GR–S rubber and vulcanized, the cord showed very good adhesion with the rubber.

Example XI

Tire cord of polypivalolactone was dipped in a 1% solution of p,p',p''-triphenylmethane triisocyanate in methylene chloride, after which the cord was dried at room temperature for 8 weeks. It was then treated with a rubber latex composition as used in Example III, and dried for 10 minutes at 110° C. After being embedded in natural rubber and vulcanized, the cord was found to have good adhesion with the rubber.

Example XII

A cord of doubled 1500 denier 200-filament yarn from polypivalolactone was passed through an aqueous bath containing 400 parts of a 70 butadiene-15 methylvinyl-pyridine-15 styrene copolymer latex in addition to 30 parts of a resorcinol-formaldehyde precondensate, 7 parts of formaldehyde 3 parts of ammonia, 42 parts of powder (particle size 15–35μ) of polystyrene-encapsulated naphthalene-1,5-diisocyanate and 520 parts of water. The cord was then dried under tension for 1 minute at 220° C., embedded in natural rubber and vulcanized for 60 minutes at 140° C. The adhesion between cord and rubber was found to be very good.

Example XIII 5 parts of p,p'-diphenylmethane-bis(phenylurethane) were treated with 0.5 part of sodium alginate, 0.004 part of NaOH and 95 parts of water for 24 hours in a ball mill. After filtration 3 parts of tert-butyl acrylamide were added to 92 parts of the filtrate, after which the mixture was homogenized. After addition of 5 parts of a 40% butadiene-vinylpyridine-styrene (70/15/15) latex the pH of the composition was adjusted to 9. A tire cord as used in Example XII was treated with this composition, then dried for 4 minutes at 170° C., embedded in natural rubber and vulcanized for 50 minutes at 140° C. The adhesion between cord and rubber was found to be very good.

I claim as my invention:

1. An article of manufacture comprising an unsaturated vulcanizable hydrocarbon rubber and as a reinforcing material distributed therethrough a fibrous polymerized α,α-dialkyl-β-lactone.

2. An article according to claim 1 wherein the lactone is polymerized pivalolactone.

3. An article according to claim 1 wherein the fibrous polylactone has been pretreated with an organic adhesion-improving agent of the group consisting of polyepoxides, polyisocyanates and polyamines.

4. In the process for the preparation of rubber reinforcing fibrous material, the step comprising treating polypivalolactone fibrous material with an organic adhesion-improving agent of the group consisting of polyisocyanates, polyepoxides, polyamines, polyamides, and mixtures thereof.

References Cited

UNITED STATES PATENTS

| | | | |
|---|---|---|---|
| 2,570,895 | 10/1951 | Wilson | 161—176 |
| 2,817,616 | 12/1957 | Wolfe | 57—153 |
| 2,922,727 | 1/1960 | Levison | 161—227X |
| 2,995,176 | 8/1961 | Waugh | 161—227X |
| 3,222,238 | 12/1965 | Krysiak | 161—227X |
| 3,271,366 | 9/1966 | Kreuz | 161—227X |
| 3,307,966 | 3/1967 | Shoaf | 156—110X |
| 3,411,980 | 11/1968 | Leshin | 161—227X |
| 3,438,922 | 4/1969 | Ueno | 161—190X |

HAROLD ANSHER, Primary Examiner

U.S. Cl. X.R.

74—232; 152—356, 359; 161—190, 227, 252